(12) United States Patent
Chang

(10) Patent No.: US 7,817,141 B2
(45) Date of Patent: Oct. 19, 2010

(54) PORTABLE ELECTRONIC DEVICE

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 627 days.

(21) Appl. No.: 11/781,561

(22) Filed: Jul. 23, 2007

(65) Prior Publication Data

US 2008/0259035 A1  Oct. 23, 2008

(30) Foreign Application Priority Data

Apr. 20, 2007  (CN)  ......................... 2007 1 0200490

(51) Int. Cl.
*G09G 5/08*  (2006.01)
(52) U.S. Cl. .................... 345/169; 345/167; 455/95; 455/556.2; 348/14.05
(58) Field of Classification Search .............. 345/156, 345/157, 158, 169, 179, 167; 455/95, 556.2; 348/14.01–14.05
See application file for complete search history.

(56) References Cited

U.S. PATENT DOCUMENTS

| 5,583,541 | A | * | 12/1996 | Solhjell | ...................... 345/163 |
| 6,326,948 | B1 | * | 12/2001 | Kobachi et al. | ............. 345/157 |
| 6,781,572 | B2 | * | 8/2004 | Funakoshi | ................... 345/160 |
| 7,102,626 | B2 | * | 9/2006 | Denny, III | .................... 345/179 |
| 2007/0162940 | A1 | | 7/2007 | Pae et al. | |

FOREIGN PATENT DOCUMENTS

| CN | 00256664.8 | 10/2001 |
| CN | 1395401 A | 2/2003 |

* cited by examiner

*Primary Examiner*—Abbas I Abdulselam
(74) *Attorney, Agent, or Firm*—Jeffrey T. Knapp

(57) ABSTRACT

A portable electronic device includes a main body, a display screen mounted on the main body, a track ball, a light source, a camera module and a signal processor. The track ball has a reflecting pattern provided on an outer surface thereof and is rotatable relative to the main body. The light source is configured (i.e., structured and arranged) for illuminating the main body. The camera module is configured for receiving and converting the light reflected from the track ball into electronic image signals containing movement information of the reflecting pattern of the track ball. The signal processor is configured for controlling movement of a cursor on the display screen according to the movement information of the reflecting pattern of the track ball contained in the electronic image signals.

8 Claims, 4 Drawing Sheets

PORTABLE ELECTRONIC DEVICE

BACKGROUND

1. Technical Field

The present invention relates to portable electronic devices, and particularly to a portable electronic device having an integral mouse mechanism.

2. Description of Related Art

With the ongoing development of microcircuitry and multimedia technology, portable electronic devices, including mobile phones, personal digital assistants (PDAs) and multimedia players have integrated more and more complex systems, such as windows™ mobile operating systems and image systems. In order to provide more comfortable browser interfaces for the systems, display screens of such portable electronic devices are correspondingly required to become larger.

However, when the display screens become larger, keyboards and mice become more important devices for controlling portable electronic devices. However, the attachment of an external mouse will result in the portable electronic devices becoming more difficult to carry.

What is needed, therefore, is a portable electronic device which has an integral mouse mechanism.

SUMMARY

In a preferred embodiment, an exemplary portable electronic device includes a main body, a display screen mounted on the main body, a track ball, a light source, a camera module and a signal processor. The track ball has a reflecting pattern provided on an outer surface thereof and is rotatable relative to the main body. The light source is configured (i.e., structured and arranged) for illuminating the main body. The camera module is configured for receiving and converting the light reflected from the track ball into electronic image signals containing movement information of the reflecting pattern of the track ball. The signal processor is configured for controlling movement of a cursor on the display screen according to the movement information of the reflecting pattern of the track ball contained in the electronic image signals.

Other advantages and novel features of the present invention will become more apparent from the following detailed description of preferred embodiment when taken in conjunction with the accompanying drawings.

BRIEF DESCRIPTION OF THE DRAWINGS

Many aspects of the portable electronic device can be better understood with reference to the following drawings. The components in the drawing are not necessarily drawn to scale, the emphasis instead being placed upon clearly illustrating the principles of the present portable electronic device. Moreover, in the drawings, like reference numerals designate corresponding parts throughout the several views.

DETAILED DESCRIPTION OF THE PREFERRED EMBODIMENTS

Embodiments of the present portable electronic device will now be described in detail below and with reference to the drawings.

Figure 1:
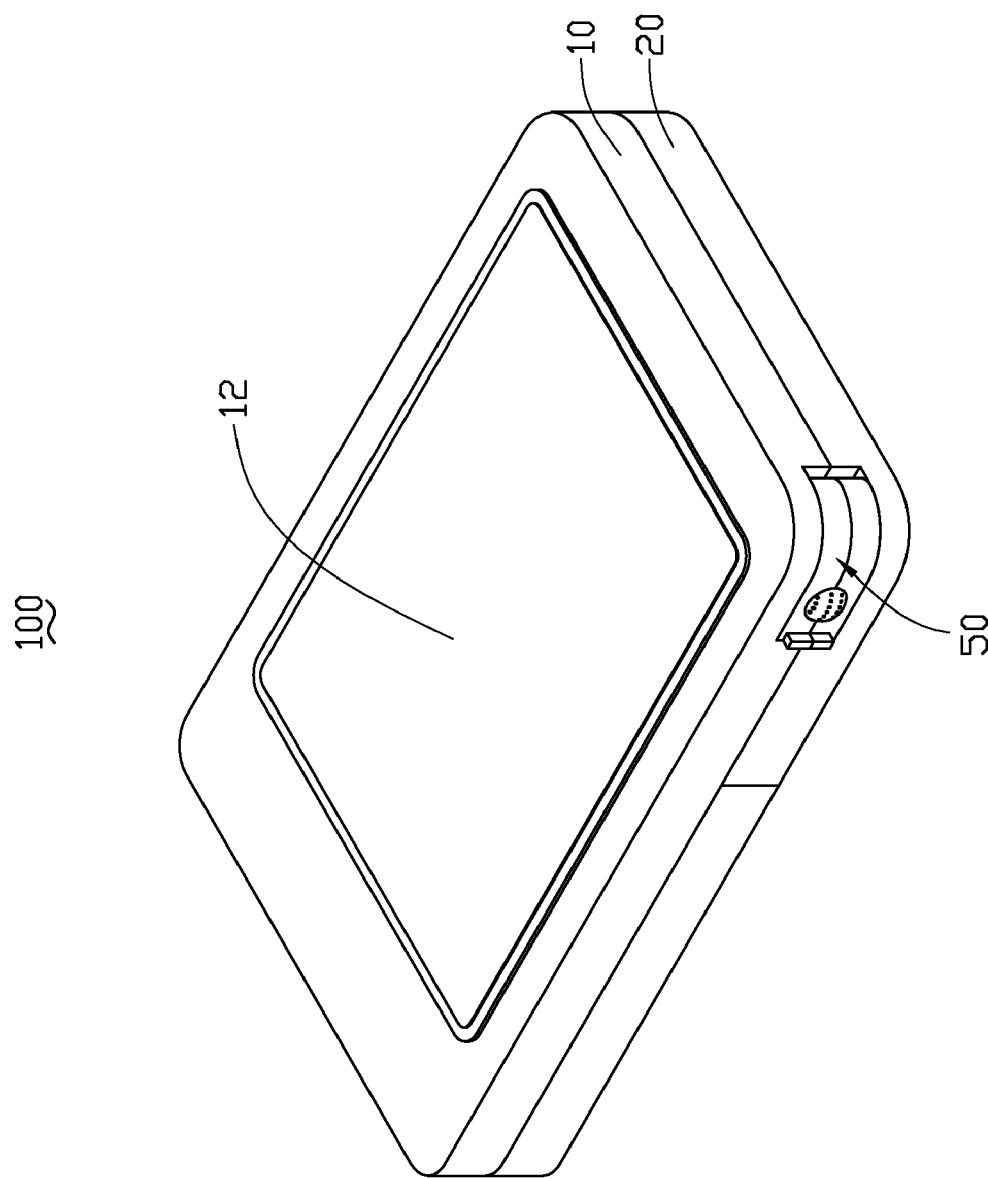
FIG. 1 is schematic view of a portable electronic device according to a preferred embodiment of the present invention.
Figure 2:
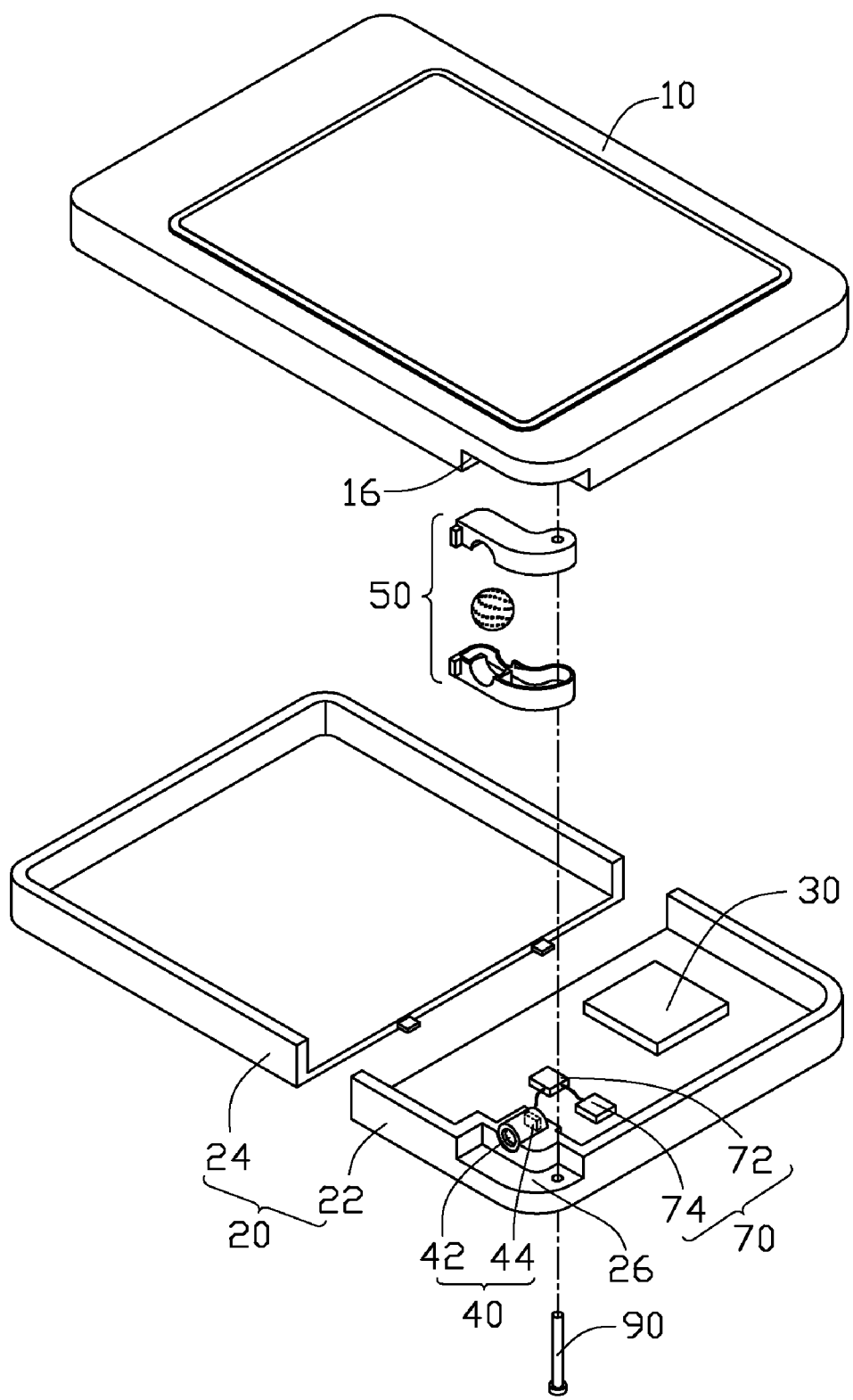
FIG. 2 is a partially exploded view of the portable electronic device shown in FIG. 1.

Referring to FIGS. 1 and 2, an exemplary portable electronic devices 100 according to a preferred embodiment is shown. The portable electronic devices 100 is a mobile phone including a front body 10, a back body 20 coupled to the front body 10, a central processing unit 30, a camera module 40, a track ball module 50 and a mouse signal processing module 70. The central processing unit 30, camera module 40 and the mouse signal processing module 70 each are located within the front body 10 and the back body 20. The track ball module 50 is rotatably mounted to the front body 10 and the back body 20.

The front body 10 has a display screen 12 mounted thereon, and a first gap 16 defined on a side wall thereof. The back body 20 includes a first portion 22 being fixedly attached to the front body 10, and a second portion 24 being removable from the first portion 22 and the front body 10. The first portion 22 of the back body 20 has a second gap 26 defined on a side wall thereof and opposite to the first gap 16 of the front body 10. The central processing unit 30 is responsible for performing instructions and calculations received from other hardware and software components in the whole portable electronic devices 100. The display screen 12 is configured for displaying results performed by the central processing unit 30.

The camera module 40 includes at least one lens 42 and an image sensor 44 in alignment with the at least one lens 42. The image sensor 44 can be selected from a charge coupled device (CCD for short) or a complementary metal oxide semiconductor transistor (CMOS for short). The camera module 40 faces toward the first and second gaps 16, 26 of the front and back bodies 10, 20.

Figure 3:
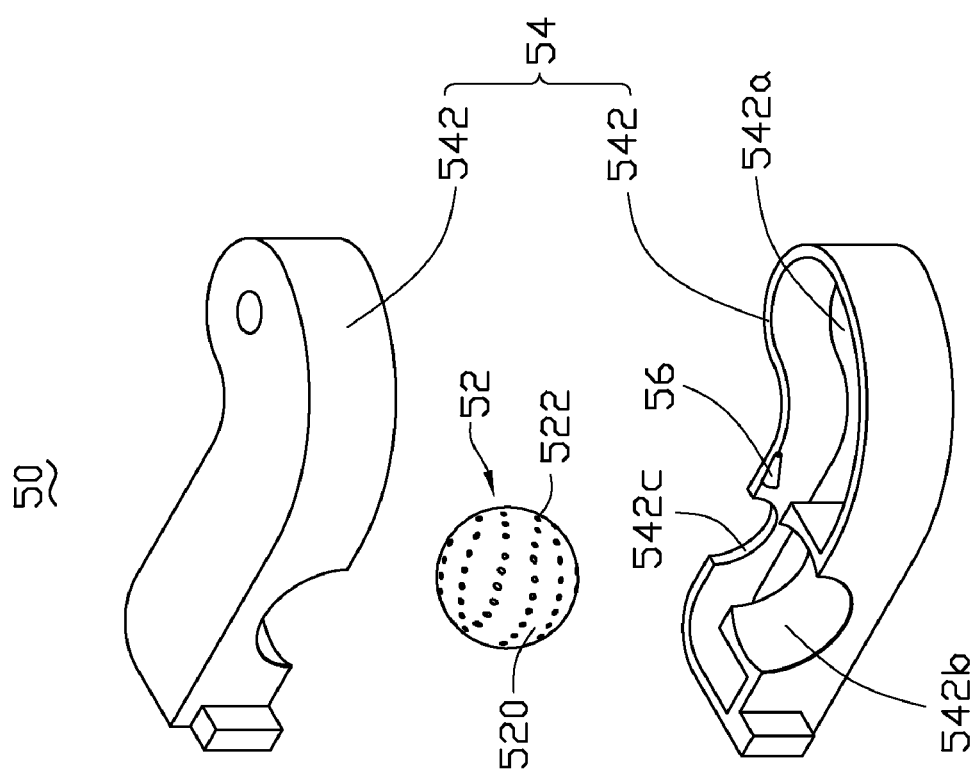
FIG. 3 is an enlarged view of the track ball module shown in the FIG. 2.
Figure 4:
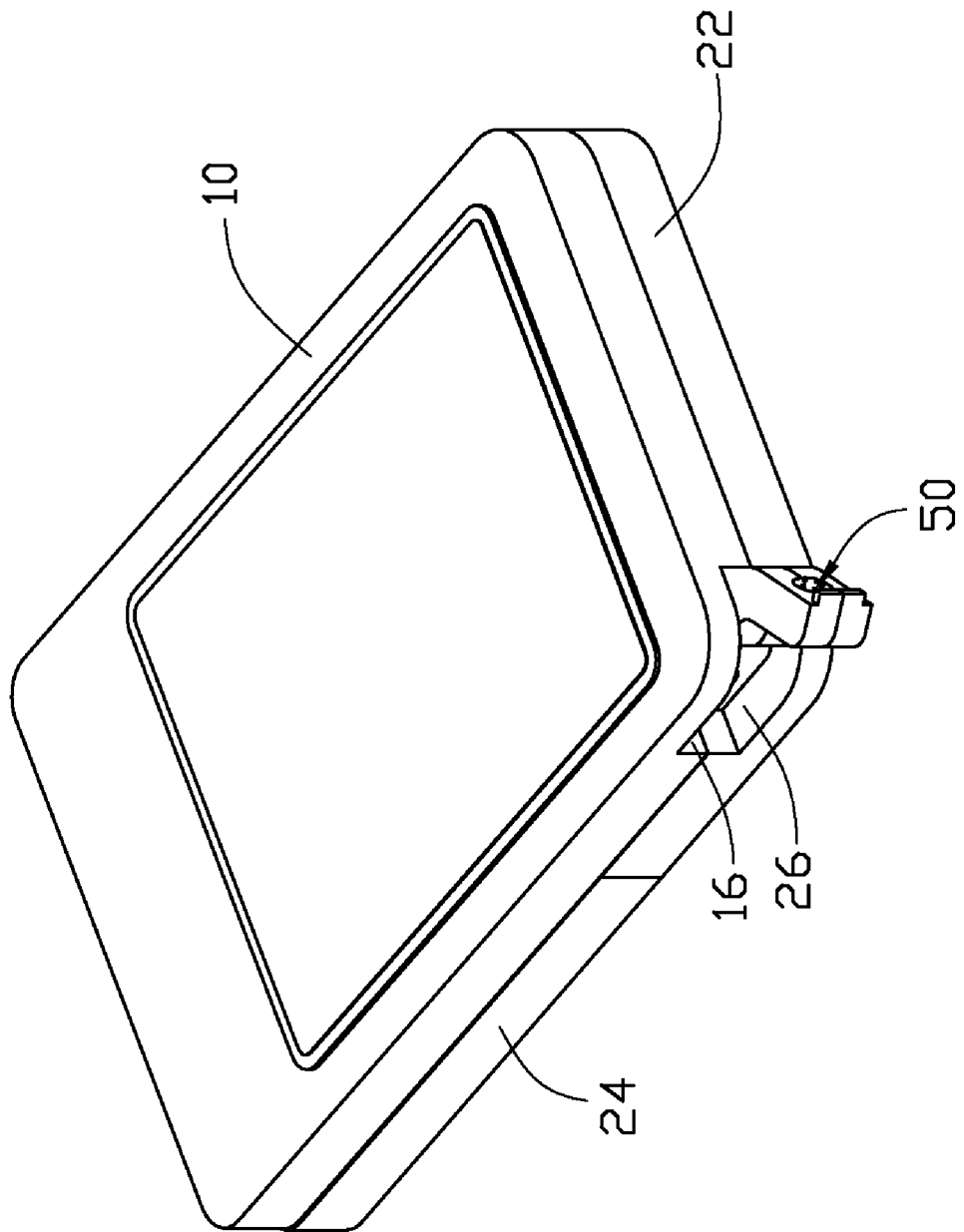
FIG. 4 is a schematic view of the track ball module in an open position relative to the front and back bodies.

As is shown in FIG. 3, the track ball module 50 includes a track ball 52, a housing 54 and a light source 56. The track ball 52 has a plurality of circular concave dimples 522 on an outer surface 520 thereof. The housing 54 includes two symmetrical brackets 542. The two brackets 542 each have an inner space 542a, a track ball receiving groove 542b and a light incident gap 542c. The track ball receiving groove 542b and the light incident gap 542c are defined parallel on two sidewalls of the inner space 542a. The light source 56 can be a light emitting diode (LED), a halide lamp or a fluorescent lamp. The light source 56 is arranged within one of the two brackets 542 and configured for illuminating the track ball 52 which is rotatably received between the two track ball receiving grooves 542b of the two brackets 542. The track ball 52 is partially exposed to an outside. The track ball module 50 is received in the first and second gaps 16, 26 of the front and back bodies 10, 20, and the housing 54 connects with the front and back bodies 10, 20 by a hinge 90. In this way, the whole track ball module 50 is movable relative to the front and back bodies 10, 20 between a closed position (see FIG. 1) and an open position (see FIG. 4).

The mouse signal processing module 70 includes a digital signal processor 72 and a mouse cursor controller 74. The mouse signal processing module 70 is connected with the camera module 40.

When the track ball module 50 is in a closed position relative to the front and back bodies 10, 20 (see FIG. 1), the camera module 40 is blocked by the track ball module 50. The concave dimples 522 on the outer surface 520 of the track ball 52 follows the rotation of the whole track ball 52. The outer surface 520 of the track ball 52 reflects the light from the light source 56, and the camera module 40 will receive and convert the light reflected from the patterned surface of the track ball 52 into electronic image signals containing movement information of the concave dimples 522 on the outer surface 520 of the track ball 52. The digital signal processor 72 is configured for converting the electronic image signals into digital signals, and then giving the digital signals to the mouse cursor controller 74. The mouse cursor controller 74 is configured for positioning a mouse cursor according to the movement information of the concave dimples 522 on the outer surface 520 of the track ball 52, and then giving instructions of the mouse cursor position to the central processing unit 30. The central processing unit 30 receives and performs the instructions from the mouse cursor controller 74, and the display screen 12 then displays the mouse cursor thereon.

When the track ball module 50 is in an open position relative to the front and back bodies 10, 20 (see FIG. 4), the camera module 40 can receive light transmitted through the first and second gaps 16, 26 of the front and back bodies 10, 20. In this way, the camera module 40 can take images from outside.

It is understood that, the portable electronic device 100 may be a different device other than a mobile phone, but also can be a personal digital assistant (PDAs), a multimedia player and so on.

It is understood that the above-described embodiment are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A portable electronic device, comprising:
    a main body;
    a display screen mounted on the main body;
    a track ball having a reflecting pattern provided on an outer surface thereof, the track ball being rotatable relative to the main body, the track ball being partially received in the main body and having a portion exposed to an outside of the main body;
    a light source for illuminating the track ball;
    a camera module mounted in the main body and configured for receiving and converting the light reflected from the track ball into electronic image signals containing movement information of the reflecting pattern of the track ball; and
    a signal processor for controlling movement of a cursor on the display screen according to the movement information of the reflecting pattern of the track ball contained in the electronic image signals.

2. The portable electronic device as described in claim 1, wherein the portable electronic device is selected from a group consisting of mobile phone, personal digital assistant and multimedia player.

3. The portable electronic device as described in claim 1, wherein the light source is selected from a group consisting of light emitting diodes, halide lamps and fluorescent lamps.

4. The portable electronic device as described in claim 1, wherein the reflecting pattern includes a plurality of concave dimples defined on the outer surface of the track ball.

5. The portable electronic device as described in claim 4, wherein the concave dimples are circular dimples.

6. A portable electronic device, comprising:
    a main body;
    a display screen mounted on the main body;
    a track ball having a reflecting pattern provided on an outer surface thereof, the track ball being rotatable relative to the main body;
    a light source for illuminating the track ball;
    a camera module mounted in the main body and configured for receiving and converting the light reflected from the track ball into electronic image signals containing movement information of the reflecting pattern of the track ball;
    a housing for rotatably receiving the track ball therein, the housing being movable relative to the main body between a closed position where the camera module is blocked by the track ball, and an open position where the camera module is exposed to an outside; and
    a signal processor for controlling movement of a cursor on the display screen according to the movement information of the reflecting pattern of the track ball contained in the electronic image signals.

7. The portable electronic device as described in claim 6, wherein the light source is arranged in the housing.

8. The portable electronic device as described in claim 6, wherein the housing is hinged to the main body.

* * * * *